Dec. 23, 1969  G. H. MILLER  3,485,993
METHOD OF RESISTANCE SOLDERING ATTACHMENT
WIRES TO ORTHODONTIC ARCH WIRES
Original Filed March 15, 1965  2 Sheets-Sheet 1
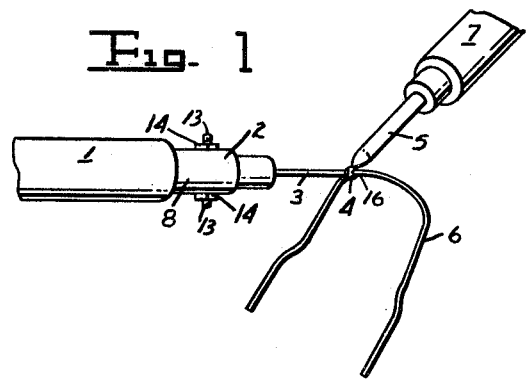
Fig. 1
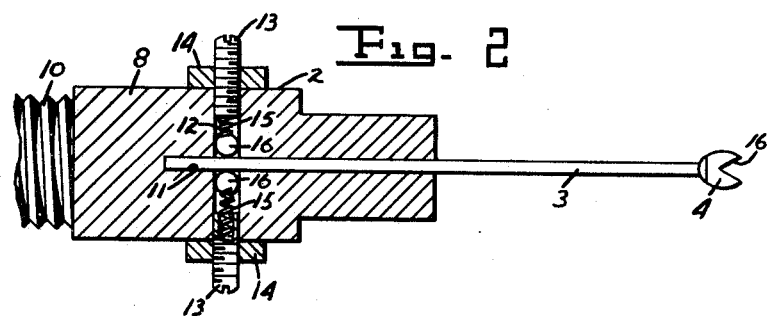
Fig. 2
Fig. 3
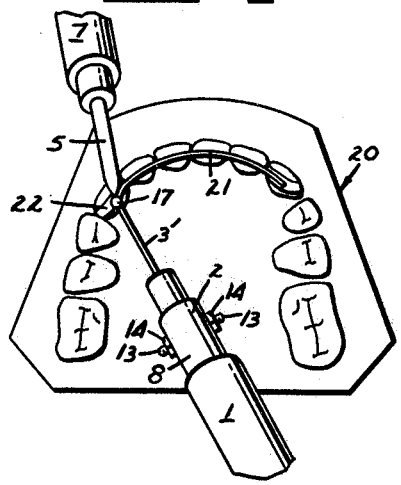
Fig. 4
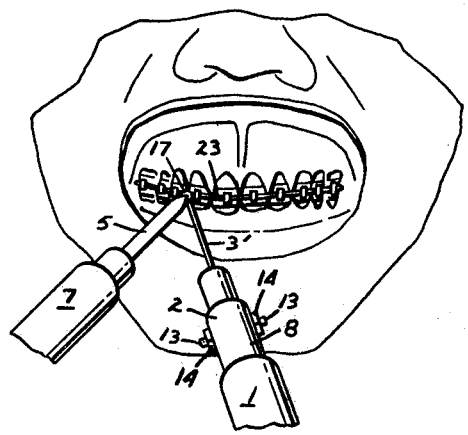
INVENTOR.
GILBERT H. MILLER
BY
ATTYS.

Dec. 23, 1969 G. H. MILLER 3,485,993
METHOD OF RESISTANCE SOLDERING ATTACHMENT
WIRES TO ORTHODONTIC ARCH WIRES
Original Filed March 15, 1965 2 Sheets-Sheet 2

INVENTOR.
GILBERT H. MILLER
BY
ATTYS.

United States Patent Office 3,485,993
Patented Dec. 23, 1969

3,485,993
METHOD OF RESISTANCE SOLDERING ATTACHMENT WIRES TO ORTHODONTIC ARCH WIRES
Gilbert H. Miller, Spokane, Wash., assignor to Dontic Corporation, Spokane, Wash., a corporation of Washington
Continuation of application Ser. No. 439,674, Mar. 15, 1965. This application June 12, 1967, Ser. No. 649,786
Int. Cl. B23k 1/02, 1/04
U.S. Cl. 219—85                                11 Claims

ABSTRACT OF THE DISCLOSURE

The disclosure describes a method for making orthodontic appliances by utilizing an electrical resistance heating technique for soldering two appliance elements together. The method includes the steps of placing a pre-soldered attachment wire 3 against an arch wire 6 and then passing a current through the attachment wire and the solder by touching the solder with an electrode.

CROSS REFERENCE TO RELATED APPLICATION

This is a continuation of application Ser. No. 439,674, filed Mar. 15, 1965, now abandoned.

BACKGROUND OF THE INVENTION

This invention relates to methods of making orthodontic appliances and more particularly to methods of making orthodontic appliances utilizing electrical resistance soldering technique.

The use of electric soldering by an orthodontist in a conventional process for producing a solder joint using a high temperature silver or gold alloy solder commonly involves a rather complicated process. A typical method utilizes two independent electrodes, one of which is normally clipped to one of the workpieces and the other being a carbon electrode or stylue which should be placed on the solder at the joint being formed to thereby complete a resistance circuit in the joint through the workpiece and clip across a source of electrical energy. Besides manipulating the two electrodes, the operator must also manually place on a joint sufficient solder and flux to complete a sound mechanical joint after the solder has been melted and has adhered to the wires. This involves considerable manipulation on the part of the operator in order to handle the two workpieces, the two electrodes, the solder and the flux. Often, the two workpieces are temporarily welded so that further clamping of them is unnecessary. In any event, there still remains the necessity of properly locating the two electrodes, the solder and the workpieces. In every case, the operator is faced with the necessity of preventing annealing of the appliance wires during heating of the solder. Due to the difficulty of maintaining optimum time conditions during the heating of the solder many such joints are failures and it is not uncommon that the entire appliance being fabricated must often be discarded due to overheating of a portion of it.

Besides the damage to the workpieces another serious difficulty posed by the conventional type of process is the possibility of the solder flowing to the clamp used as one of the electrodes, thereby ruining the appliance being constructed and permanently fouling the somewhat expensive clamp that must then be replaced. This danger requires that the clamp be spaced from the joint, thereby increasing the possibility that the workpiece between the clamp and the joint area might become overheated and thereby lose its necessary strength properties.

A most important object of this invention is to eliminate the danger of unduly heating the appliance wires being soldered, a risk that often results in the ruin of the appliance being fabricated. In the present invention heat is applied directly to the solder forming the joint and not to the pieces being joined.

Another object of this invention is to provide a novel method wherein one of the soldering electrodes may often be used as a structural member in the finished orthodontic appliance.

The method of this invention eliminates the use of the clamp electrode and independent pieces of solder to form the required joint. The process utilizes a disposable electrode or attachment wire that is used to produce only a single joint on the appliance, the electrode being made of materials that are relatively inexpensive. In this manner, the electrode can be applied directly to the appliance joint area, eliminating the necessity of separating the electrodes by any appreciable distance along the workpieces and minimizing the area of the appliance pieces that is heated. In addition, the process utilizes a pre-soldered disposable electrode or attachment wire which both applies the required heat to the appliance joint and the necessary solder.

These and further objects will be evident from the following disclosure, taken together with the accompanying drawings, which illustrate a preferred form of the invention. It is to be understood that the preferred method and apparatus disclosed in this specification and illustrated in the drawings is not intended to limit the scope or application of the invention which is defined in the claims which follow.

BRIEF DESCRIPTION OF THE DRAWINGS

In the drawings:
FIGURE 1 is a fragmentary perspective view of the apparatus used for performing an electric soldering technique according to the method of this invention to make orthodontic appliances, portions of the electrode grips being broken away;
FIGURE 2 is an enlarged cross sectional view through an electrode holder designed to grip the attachment wire used in the practice of this invention;
FIGURE 3 is a fragmentary top view illustrating the use of an attachment wire on a model;
FIGURE 4 is a fragmentary front view illustrating the use of the invention to produce a solder joint on an appliance while the appliance is in a patient's mouth.

DESCRIPTION OF A PREFERRED EMBODIMENT

Figure 5:
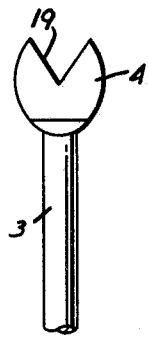
FIGURE 5 is an enlarged fragmentary view of the top of an attachment wire without the solder that may be used in performing the subject method.

The joint shown in FIGURE 1 is formed on a wire appliance arch 6. The arch 6 could be held in any conventional type of vice or in the hand of the operator, since under the method of this invention, the transmission of heat through the arch 6 is restricted to a definite minimum.

In the method as illustrated in FIGURE 1, the disposable electrode or attachment wire 3 is carried by an electrode holder 2 manipulated by means of a grip 1. The wire 3 is electrically conductive. A carbon electrode 5 is held within a grip 7. The grip 1 can be held in the hand or placed in a clamp so that it frees the hands of the operator. Any type of conventional holder might be utilized to attach the grip 1 in a fixed position relative to a work bench or soldering machine. The electrode holder 2 and the carbon tip 5 are wired to a conventional source of electrical energy (not shown) such as is used conventionally in the preparation of high temperature solder joints by the electrical resistance process.

In FIGURE 2 is illustrated a cross sectional view through the electrode holder 2. The particular electrode holder 2 is only illustrative of the type of holder structure that might be used to hold the electrically conductive attachment wire 3. It includes a cylindrical body 8 having a threaded section 10 at one end adapted to be threadably received within a conventional electrode grip 1. The cylindrical body 8 is provided with a longitudinal central aperture 11 and a perpendicular aperture 12 that intersects the aperture 11. The aperture 12 is closed at each end by set screws 13 that are threadably engaged with the body 8. The screws 13 are blocked in place by nuts 14 engaged therewith. The inner end of each set screw 13 is hollow and receives a small compression spring 15, the remaining end of which bears against a ball 16 in the aperture 12. Basically, the opposed balls 16 frictionally bear against the attachment wire 3 after insertion of the wire 3 within the aperture 11. This frictional engagement is sufficiently great to hold the wire 3 temporarily in a fixed position relative to the holder 2, but permits the release of the wire 3 by a reasonable force parallel to its length. The tension on the wire 3 is adjustable by applying more or less compression to the spring 15 by adjustment of the respective screws 13.

Figure 6:
FIGURE 6 is a side view of the attachment wire shown in FIGURE 5.

Again referring to FIGURE 1, the holder 2 grips the attachment wire 3, the top of which is shown in greater detail in FIGURES 5 and 6. In the process as illustrated in FIGURE 1, the wire 3 besides being a solder carrying wire serves a second purpose as one of the elements of the finished joint, being used to form an elastic hook, a gear hook, a stop or a spur on the orthodontic appliance.

The attachment wire 3 is basically a piece of wire to which the solder used in the process will adhere. Hard brass wire approximately one inch long has been successfully used in actual orthodontic practice, in diameters of .025, .028 and .0325 inch. If desired, other material for this purpose might be silver or copper alloys or even possibly various coated combinations of these metals. The arch wire 6 is commonly a stainless steel wire. The outer end of the element 3 may be flattened and have an enlarged area designated by the numeral 4. The tip of the flattened position 4 is preferably formed with an inwardly directed notch 19 adapted to permit the attachment wire 3 to better engage the wire arch 6 and to allow the flattened portion 4 to be located directly in the joint area.

Figure 7:
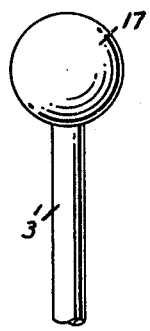
FIGURE 7 is a view similar to FIGURE 5 showing the attachment wire with the solder mounted on the tip.
Figure 8:
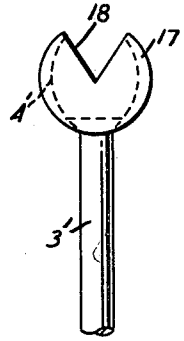
FIGURE 8 is a side view of the attachment wire shown in FIGURE 5.
Figure 9:
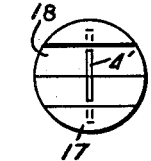
FIGURE 9 is a top view of the attachment wire shown in FIGURE 7.

A ball of solder 17 is melted onto the wire 3' totally enclosing the tip 4' as shown in FIGURES 7–9. The enlarged and flattened top 4' increases the mounting area available for retention of the solder 17. The solder 17 may then be notched as shown at 18 in FIG. 8 so that the tip 4' as well as the solder can be located relative to the arch wire. The solder 17 can be readily dipped in the necessary flux prior to heating of the solder to produce the desired joint or the appliance.

The operator then holds the grip 1 with one hand and holds the carbon electrode 5 with the other. The solder is positioned in contact with the joint area with the notch 18 engaging the arch 16. The operator places the carbon electrode 5 on the solder and releases the electrode 5 from contact with the solder when it has melted and produced the joint desired. Since the operator is relieved of the necessity of manually handling both electrode and the pieces being soldered, he can better concentrate on the release of the carbon electrode 5 immediately after the solder has formed the necessary joint, thereby eliminating overheating of the wire arch 6. Since the attachment wire 3' in this instance may be part of the finished joint, there is absolutely no necessity for initial preparation of the two work pieces by temporary joining methods. The entire operation is extremely simple in nature.

The use of a pre-soldered attachment wire 3' eliminates all manipulation of solder during the soldering process. The notch 18 is fitted against the wire arch 6 and the carbon electrode 5 is manually placed in contact with the mass of solder 17. The preparation of the wire 3' with the required amount of solder 17 eliminates waste of excess solder and further frees the operator from manually handling loose solder. When the solder mass 17 has been caused to flow to the arch 6, the carbon electrode 5 is removed and the wire 3' is allowed to cool.

After the solder at the joint has cooled, the wire 3' is released from the holder 2 and cut off at the desired length. It can then be bent to the configuration required in the particular appliance. This operation has been successfully used to form hooks for orthodontic elastics or head gears. The wire 3' may be a permanent part of the joint and becomes a structural part of the appliance itself.

In FIGURE 3 the use of a pre-soldered attachment wire is illustrated on a model of the lower arch of a person's mouth generally designated by the numeral 20. The wire arch 21 located inside the model 20 is shown with a solder joint being made to a band 22, the wire arch 21 being temporarily held in place on the model 20 by sticky wax. The steps of the process are precisely as described above.

Figure 10:
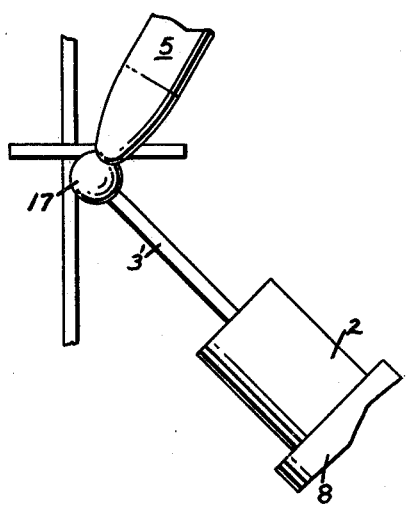
FIGURE 10 is an enlarged fragmentary view showing the initial placement of the attachment wire and the arch wire during the soldering of a joint between two intersecting appliance wires.
Figure 11:
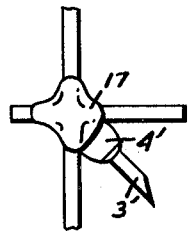
FIGURE 11 is a view similar to FIGURE 10 showing the joint immediately after the solder has cooled.
Figure 12:
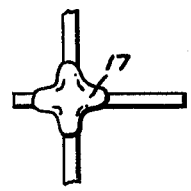
FIGURE 12 is a fragmentary view showing the finished joint.

The use of this method to form a joint between two intersecting wires is illustrated in FIGURES 10 through 12. In this application the wire 3 does not remain a part of the appliance but serves as a pre-soldered electrode or conductive solder carrier wire.

As illustrated in the steps shown in FIGURES 10 and 11, the protruding part of the wire 3', after cooling of the joint, is trimmed as illustrated in FIGURE 11 and then ground to a finished configuration. Or if desired the operator may remove the wire 3' from the molten solder 17 leaving a soldered joint as shown in FIGURE 12.

The method and apparatus described have been used in actual practice of orthodontics to replace conventional procedures. The only modification of existing equipment necessary is the electrode holder (FIGURE 2).

A dramatic application of the instant method is illustrated in FIGURE 4. The control afforded by the pre-soldered attachment wire makes possible the soldering of appliances in a patient's mouth for repair and installation purposes. Soldering in the mouth of a patient has been impossible with conventional soldering methods, but is practical and has been accomplished by the instant method utilizing the pre-soldered current carrying wire where complete control of the wire is available and where the time of heat application is at an absolute minimum. This development of a soldering method applicable to a patient's mouth is a very important advantage of the instant method and is a new result not previously thought to be possible.

Figure 13:
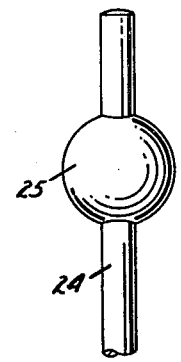
FIGURE 13 is another view similar to FIGURE 5 showing still another form of a pre-soldered disposable electrode or attachment wire.

FIGURE 13 illustrates another form of a pre-soldered conductive attachment wire for use in this type of work. In this case, the attachment wire 24 is a length of wire as previously disclosed, having a circumferential mass of solder 25 formed on it intermediate its respective ends. This type of attachment wire 24 is used in the same manner as the attachment wire 3', but is utilized where the attachment must protrude in two directions as a part of the finished joint. Again, the carbon electrode 5 is used to touch the mass of solder 25 and melt the solder on the wire 24. The solder 25 is then allowed to cool on the appliance to which it is attached and the ends of the wire 24 are trimmed and bent as desired.

Various modifications might be made in the method steps, utilizing different manipulations of the soldering equipment and structural modifications might be made in the conductive attachment wire depending upon the type of work to which a particular wire is being applied. While the method has been particularly effective when utilizing a high temperature solder having the melting point of approximately 1200° F.

Having thus described my invention, I claim:

1. A method of applying solder to an orthodontic appliance without substantially heating the appliance, comprising the steps of:
   (a) contacting the appliance at the desired location with a solder mass having an electrically conductive wire embedded therein that is wired to a source of electrical energy;
   (b) contacting the solder with an electrode wired to the source of electrical energy to complete a resistance path for the conduction of current through the solder and conductive wire to melt the solder;
   (c) permitting the molten solder to flow onto the appliance and
   (d) removing the electrode from the molten solder to allow the solder to harden on the appliance.

2. The method as defined in claim 1 further comprising the step of removing the electrically conductive wire from the solder before the solder hardens.

3. The method as defined in claim 1 further comprising the step of disengaging the electrically conductive wire from the electrical energy source after the solder has hardened.

4. The method as defined in claim 3 further comprising the step of bending the electrically conductive wire as desired to form an orthodontic attachment that is soldered to the appliance.

5. The method as defined in claim 1 wherein the solder is applied at the point contact between two appliance elements to join the two elements together.

6. The method as defined in claim 5 further comprising the step of removing the electrically coiductive wire from the solder before the solder hardens.

7. In the process of making orthodontic appliances, including the joining of a presoldered electrically conductive attachment wire to an appliance member such as an arch by performing the following steps:

(a) mounting the attachment wire in a holder that is wired to a source of electrical energy;
   (b) a contacting the solder carried by the attachment wire to the applicance member at the desired point of joining;
   (c) contacting the solder with an electrode that is connected to the source of electrical energy for forming a resistance path to conduct electrical current through the solder and the attachment wire to generate sufficient heat to melt the solder to permit the solder to flow onto the appliance member at the point of contact; and
   (d) removing the electrode from the solder for permitting the solder to harden on the attachment wire and the appliance member to form a joint therebetween.

8. In the process as defined in claim 7 wherein the attachment wire is brass wire having a diameter of between 0.025 and 0.0325 inch and the appliance member is an arch wire made of stainless steel.

9. In the process as defined in claim 7 wherein the solder is heated to approximately 1200° to melt the solder to permit the solder to flow onto the appliance member.

10. In the process as defined in claim 7 wherein the electrode is a high resistance carbon electrode.

11. In the process as defined in claim 7 further including the step of removing the attachment wire from the holder prior to bending the attachment wire into a desired shape.

References Cited

UNITED STATES PATENTS

| | | | |
|---|---|---|---|
| 1,022,482 | 4/1912 | Howell | 219—85 X |
| 1,200,810 | 10/1916 | Clemens | 219—85 X |

OTHER REFERENCES

Meier A. G., The Practical Orthodontist, 1911, pp. 16–20.

JOSEPH V. TRUHE, Primary Examiner

L. A. SCHUTZMAN, Assistant Examiner

U.S. Cl. X.R.

32—66